United States Patent [19]

Allen

[11] Patent Number: 5,054,628
[45] Date of Patent: Oct. 8, 1991

[54] WALL MOUNTED FOLDING CARRIER

[76] Inventor: Christopher B. Allen, 29 Devens St., Concord, Mass. 01742

[21] Appl. No.: 650,064
[22] Filed: Feb. 4, 1991
[51] Int. Cl.⁵ .............................................. A47F 5/00
[52] U.S. Cl. .................................... 211/104; 211/18; 211/100
[58] Field of Search ................... 211/99, 100, 104, 18, 211/19, 21

[56] References Cited
U.S. PATENT DOCUMENTS

| 610,656 | 9/1898 | Martin | 211/18 |
| 1,580,796 | 4/1926 | Snyder | 211/104 |
| 1,596,346 | 8/1926 | Gibson | 211/104 |
| 2,740,532 | 4/1956 | Kleinsmith | 211/104 |
| 3,233,745 | 2/1966 | Hashberger | 211/104 |
| 3,484,069 | 12/1969 | Larson | 211/100 X |
| 3,780,971 | 12/1973 | DeFilipps | 211/104 X |
| 3,976,200 | 8/1976 | Munns | 211/18 |

Primary Examiner—Robert W. Gibson, Jr.
Attorney, Agent, or Firm—Herbert L. Bello

[57] ABSTRACT

A folding carrier that is mountable upon a generally planar member includes a rotatably connected frame and carrying member. The frame is a substantially U-shaped member having a pair of legs and a back, each leg having a stop. The carrying member, which is also a U-shaped member, is constrained for limited rotational movement relative to the frame between a carrying position and a stored position. In its stored position, the carrying member is in a side-by-side relationship with the frame and inclined backwardly toward it. When in its extended position, the carrying member is substantially perpendicular to the planar member upon which the carrier is mounted. The carrying member bears against the stops of the frame to prevent further rotation beyond the preferred carrying position. Frictional elements that are mounted on the frame and carrying member engage the generally planar member and prevent unwanted movement of the carrier.

17 Claims, 2 Drawing Sheets

FIG. 2

WALL MOUNTED FOLDING CARRIER

BACKGROUND OF THE INVENTION

1. Field of the Invention

The present invention relates to wall mountable carriers and, more particularly, is directed towards foldable carriers of the foregoing type for storing bicycles, skis, luggage and the like.

2. Description of the Prior Art

In recent years the popularity of bicycle riding for sport, recreation, and transportation has increased. Bicycle carriers and holders of various configurations have been developed to enable owners to transport and store one or more bicycles between uses. Typical bicycle carriers that are mountable on automobiles are shown in U.S. Pat. Nos. 4,518,108 and 4,709,840. A typical wall-mounted carrier is depicted in U.S. Pat. No. 4,749,089.

The storage of bicycles using wall mounted carriers or ceiling hooks is advantageous in that it allows the bicycles to be mounted in an out of the way location, conserves floor space, and decreases congestion in cramped quarters. Typically, wall mounted carriers are in the form of large brackets having immobile extending carrying arms which project outwardly from the wall. Unfortunately, the extending carrying arms present a hazard to those passing by and can cause accidental injury. Further, such wall mountable brackets require an undersirably large storage area even when they are not in use.

A need has arisen for a carrier that can be easily mounted on a generally planar member and can be collapsed into a flat configuration for easy, out of the way, and safe storage when not in use.

SUMMARY OF THE INVENTION

It is an object of the present invention to provide a folding carrier which does not suffer from the foregoing disadvantages and limitations.

It is another object of the present invention to provide a wall mountable folding carrier that can be easily moved from a carrying position, for carrying objects such as bicycles, to a stored position, for out of the way storage.

It is a further object of the present invention to provide a wall mountable folding carrier which frictionally engages the surface of the wall and provides stable carrying arms for holding bicycles, skis, and the like.

The carrier of the present invention is characterized by a frame and a carrying member. The carrying member is rotatably mounted to the frame member and constrained for limited rotational movement relative thereto. More particularly, the carrying member can be rotationally moved between an extended carrying position and a folded stored position. The frame member is a substantially U-shaped member having a back and a pair of legs that extend from opposite ends of the back. A terminal portion of each leg is bent to form a foot. The bend in each leg defines a stop which, as delineated below, serves to engage the carrying member and lock it in its carrying position. A frictional element is positioned on the frame to engage the generally planar member when the carrier is mounted thereon.

The carrying member is a tubular member having a substantially U-shaped configuration. The carrying member includes a cross member and pair of arms that extend outwardly from opposite ends of the cross member. When the carrying member is rotated to its carrying position, a portion of it contacts and bears against the stops defined by the bends in the legs of the frame. This interaction between the carrying member and frame locks the frame and carrying member in a substantially perpendicular relationship. When in its stored position, the carrying member is inclined backwardly toward the frame and in substantially side-by-side relationship therewith. The carrying member also includes a frictional element that is positioned to press against and frictionally engage the planar member when the carrying member is in its extended carrying position. Accordingly, this friction element is positioned on the cross member at a location that will be adjacent to the planar member when the carrying member is in its carrying position.

Other general and specific objects of the invention will in part be obvious and will in part appear hereinafter.

The invention accordingly comprises the steps and apparatus embodying features of construction, combinations of elements and arrangements of parts adapted to effect such steps, as exemplified in the following detailed disclosure, and the scope of the invention is indicated in the claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
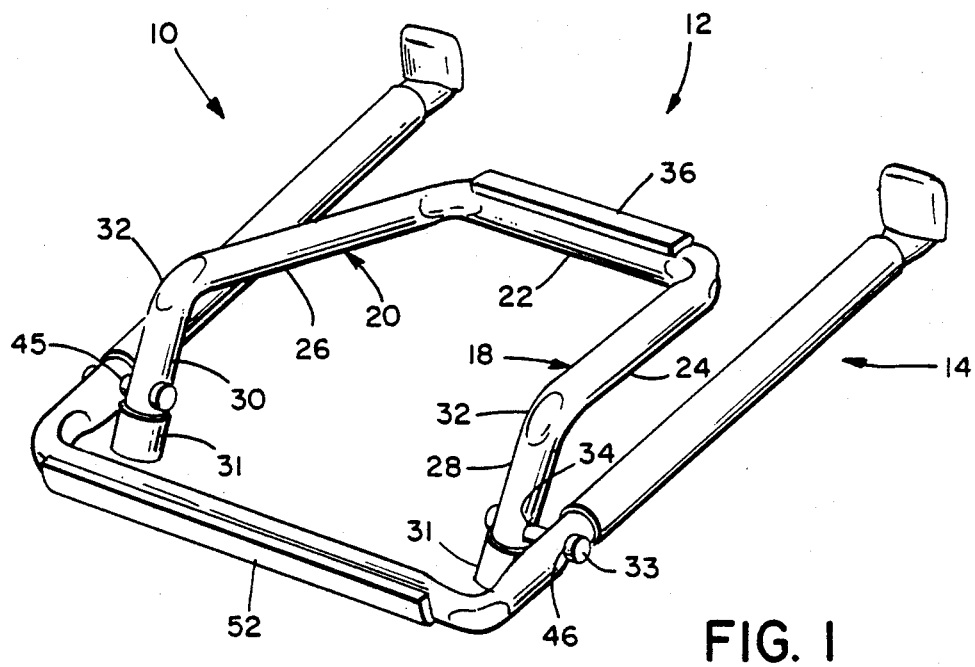
FIG. 1 is a perspective view of a foldable carrier embodying the invention in a stored position.
Figure 2:
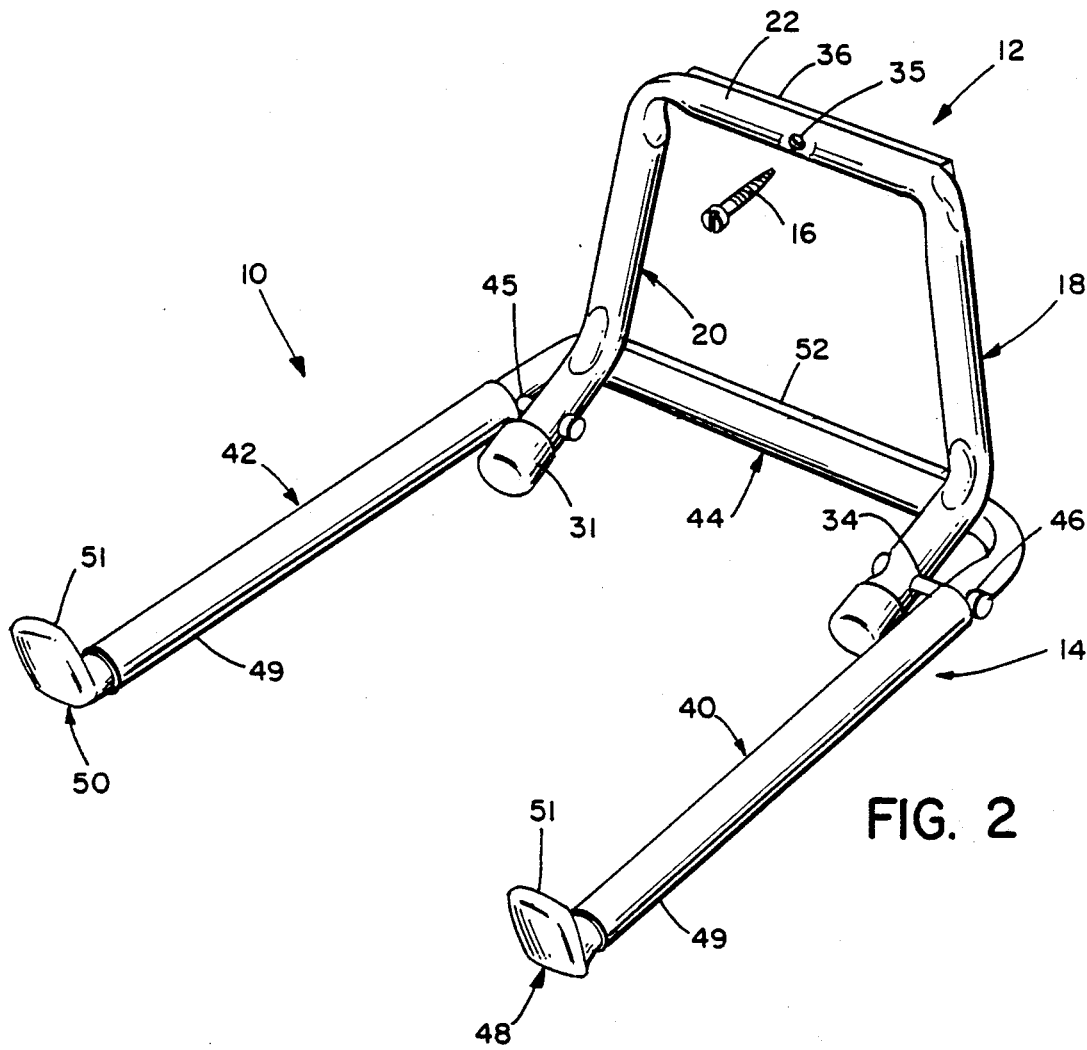
FIG. 2 is a perspective view of the carrier of FIG. 1 in its carrying position.
Figure 4:
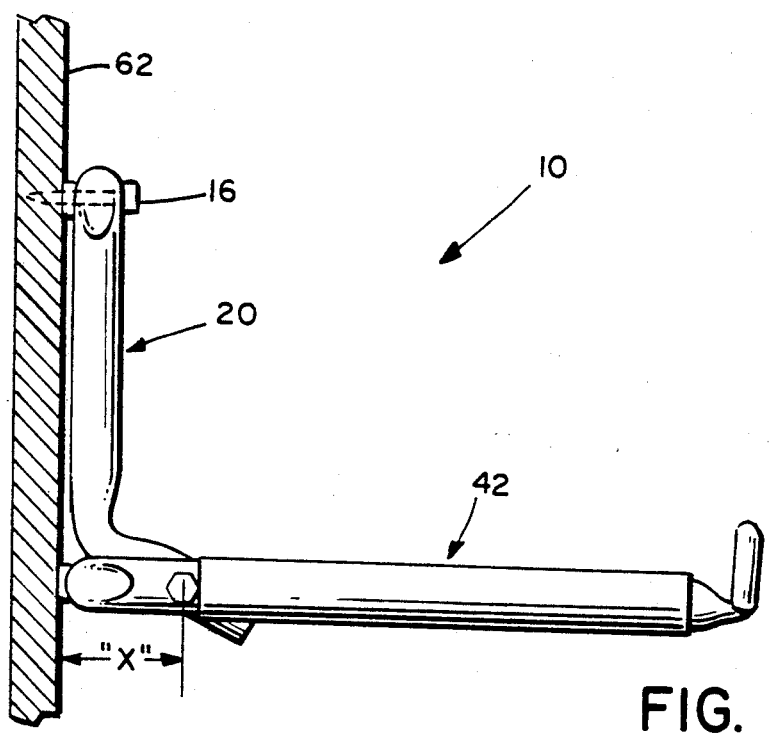
FIG. 4 is a side elevation of the carrier of FIG. 1 mounted to a wall and disposed in its carrying position.
Figure 3:
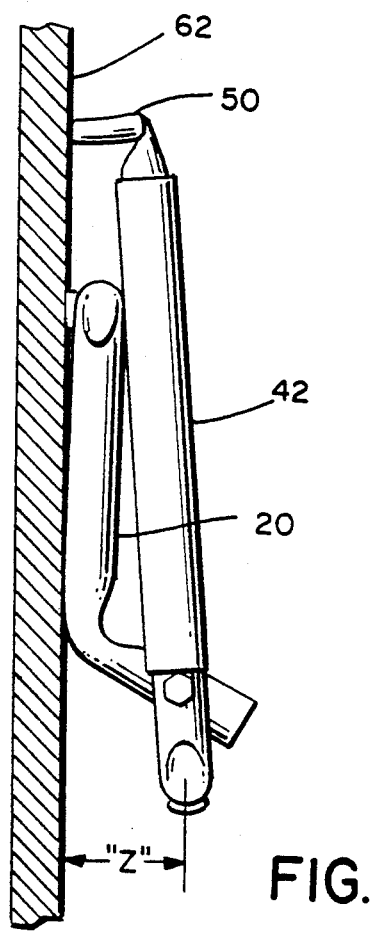
FIG. 3 is a side view of the carrier of FIG. 1 mounted to a wall and disposed in its stored position.

Referring to FIGS. 1 through 4, wherein like reference numerals refer to like parts, there is illustrated a foldable carrier 10. Foldable carrier 10 includes a frame 12 having a carrying member 14 rotatably mounted thereon. The carrying member 14 is constrained for limited rotational movement relative to the frame 12 between a carrying position, shown in FIGS. 2 and 4, and a stored position, shown in FIGS. 1 and 3. A fastening element 16, for example, a screw, can be used to secure the carrier 10 to a generally planar member 62, for example, a wall, as shown in FIGS. 3 and 4.

As shown in FIGS. 1 and 2, the frame 12 is a substantially U-shaped member which can be manufactured from virtually any strong durable material, such as aluminum, steel, or polymeric composites. Preferably, the frame 12 is constructed from aluminum tubing. The frame 12 includes a pair of legs 18 and 20 that are integral with a back 22. The legs 18 and 20, and back 22, are of sufficient size to provide mechanical support for the carrying member 14 which receives the bicycle, luggage, or other materials which may be placed on the carrier 10 for storage. The legs 18 and 20 are bent so that each has an upper portion 24 and 26, respectively, which extends substantially parallel to the generally planar 62 member when the carrier 10 is mounted thereon by means of screw 16 which passes through an aperture 35 in back 22 and is turned into the planar member 62. Feet 28 and 30 extend obliquely from the upper portions 24 and 26. A protective boot 31 manufactured from, for example, plastic or rubber, is fitted over the end of feet 28 and 30. Stop elements 32 are defined by the bends at the junctions of the upper portions 24 and 26, and the feet 28 and 30, respectively. As explained in greater detail below with reference to FIGS. 3 and 4, the stop elements 32 restrict and limit the rotational movement of the carrying member 14 relative to the frame 12. In particular, the stop elements 32 maintain the carrying member 14 substantially perpendicular to the generally planar member 62 when the carrying member 14 is in its carrying position. Each of the feet 28 and 30 includes an aperture 34 sized to receive a pin, bolt or other fastener 33 which rotatably connects the frame 12 to the carrying member 14. As best shown in FIG. 1, the apertures 34 are positioned such that upon mounting of the carrier 10 on the planar member 62, they are off-set a selected distance "Z" from the planar member 62. The off-set distance of the apertures 34 is selected to insure that upon rotation of the carrying member 14 to its stored position the carrying member 14 will be inclined, or tilted backwardly, toward the frame 12 and generally planar member 62. This configuration thus insures that the carrying member 14 will be maintained in its folded or stored position.

In the preferred embodiment, the frame 12 is secured to the planar member 62 with, for example, a single screw or bolt 16. Aperture 35, which is centrally located along a longitudinal axis of the back 22, is sized to receive the screw 16. A friction element 36 that is positioned on a portion of the back 22 which will be adjacent to the generally planar member 62 prevents significant movement of the carrier 10 when it is mounted on the planar member 62. Preferably, the friction element 36 is positioned such that upon exiting the aperture 35, the screw 16 passes through it before entering the planar member 62. The friction element 36 can be formed of any substantially non-slip material, for example, rubber, neoprene, or plastic, preferably neoprene. Glues that are familiar to those skilled in the art can be used to affix the friction element 36 to the back 22.

Carrying member 14 is mounted on the frame 12. As shown in FIGS. 3 and 4, the carrying member 14 can be rotated to a carrying position, wherein it is oriented substantially perpendicular to the frame 12 and hence generally planar member 62, from a stored position wherein it and the frame are substantially in side-by-side relationship. The carrying member 14 is a substantially U-shaped member formed of materials similar to that of the frame 12, preferably aluminum tubing. Carrying member 14 comprises a pair of arms 40 and 42 that are integral with a cross member 44. The arms 40 and 42 each have an aperture 45 and 46, respectively, for receiving the pin, bolt or other fastener 33 which rotatably connects the carrying member 14 to the frame 12. Accordingly, the apertures 45 and 46 are positioned such that upon assembly of the carrier 10 they are in alignment with the corresponding aperture 34 of the frame 12. As best shown in FIG. 2, the apertures 45 and 46 are positioned a distance "X" from the ends of arms 40 and 42 at cross member 44. The distance "X" is selected such that upon rotation of the carrying member 12 to its extended position, a portion of the cross member 44 will abut the planar member 62. A terminal portion of each of the arms 40 and 42 is bent upwardly to form movement limiting elements 48 and 50, respectively. Elements 48 and 50 are sufficiently long to prevent items from slipping off the carrying member 14 during use and sufficiently short to allow the carrying member to tilt backwardly when in its stored position. The ends of elements 48 and 50 rest against planar member 62 when the carrying member 14 is in its stored position. A protective sleeve 49 manufactured from, for example, plastic or rubber, can cover all or a portion of the arms 40 and 42. A protective plastic cap 51 manufactured from, for example, plastic or rubber, can be used to cover the movement limiting elements 48 and 50.

A frictional element 52 is affixed to that portion of the cross member 44 that is adjacent to the planar member 62 when the carrying member 12 is in its carrying position. As described in greater detail below, the friction element 52 of the carrying member 14 cooperates with the friction element 36 of the frame 12 to prevent movement of the carrier 10 when the carrying member 14 is in its extended position and a load is placed on carrying member 40 and 42. The friction element 52 can be formed of any substantially non-slip material, for example, rubber, neoprene, or plastic, preferably neoprene. Glues that are familiar to those skilled in the art can be used to affix the friction element 52 to the cross member 44.

Referring now to FIG. 3, carrier 10 is mounted on a generally planar member 62, e.g., an interior wall, using a single screw 16. More particularly, the carrier 10 is mounted by driving the screw 16 through the back 22 and friction element 36 of the frame 12 and into the generally planar member 62. The screw 16 is tightened until friction element 36 is firmly sandwiched between the generally planar member 62 and the back 22. By compressing the friction element 36 between the frame 12 and planar member 62, the carrier 10 is prevented from substantial movement when in either its stored or carrying position. The carrying member 12 is then rotated about an axis connecting the fasteners 33 to its stored position depicted in FIG. 3. Movement of the carrying member 14 from its stored position to its carrying position is accomplished by merely rotating the carrying member along the axis connecting the fasteners 33.

As shown in FIG. 4, the carrying member 14 is rotated in a downward direction until the arms 40 and 42 contact the stop elements 32 of the frame 12. Downward movement of the carrying member 14 is stopped by the stop elements 32 when the arms 40 and 42 are substantially perpendicular to the upper portions 24 and 26 of the frame 12 and, hence, the planar member 62. When the carrying member 14 is in this position substantially all the friction element 52 abuts and is in contact with the planar member 62. When a load is placed on the carrier 10, the downward force created by the load gives rise to a force directed toward the generally planar member 62 along a plane containing the arms 40 and 42. This latter force causes the friction element 52 to be compressed between cross member 44 and the generally planar member 62. This compression action further fixes the carrier 10 in position relative to the planar member 62, thus preventing undesired movement of the carrier 10 due to shifts in the load placed on the carrying arms 40 and 42.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A foldable carrier that is mountable on a generally planar member for storing bicycles, skis, and the like, said carrier comprising:
   (a) a frame that is configured to be mounted on the generally planar member, said frame having a back member and leg means that extend from said back member, an end portion of said leg means being bent to form a foot, said bend defining a stop means; and
   (b) a carrying member rotatably mounted to said frame and constrained for limited movement relative to said frame;
   (c) said carrying member is movable between a stored position and a carrying position when said frame is mounted on the generally planar member, said frame and said carrying member are in substantially side-by-side relationship when said frame is mounted on the generally planar member and said carrying member is in its stored position, said carrying member is tilted backwardly toward the generally planar member when said carrying member is in its stored position, said frame and said carrying member are in substantially perpendicular relationship when said frame is mounted on the generally planar member and said carrying member is in its carrying position, said carrying member being moved from said stored position to said carrying position by rotating said carrying member away from the generally planar member until said carrying member engages said stop means, said stop means preventing further rotational movement of said carrying member and holding said carrying member in a substantially perpendicular relationship with respect to said frame.

2. The foldable carrier of claim 1 including a friction means mounted on said frame, said friction means positioned on said frame so that it presses against and frictionally engages the generally planar member when said frame is mounted on the generally planar member.

3. The foldable carrier of claim 1 including a friction means mounted on said carrying member, said friction means positioned on said carrying member so that it presses against and frictionally engages the generally planar member when said frame is mounted on the generally planar member and said carrying member is in its carrying position.

4. The foldable carrier of claim 1 wherein said frame includes a back and a pair of legs that are integral with said back, said frame having a substantially U-shaped profile.

5. The foldable carrier of claim 1 wherein said carrying member includes a cross member and a pair of extending arms that are integral with said cross member, said arms being rotatably connected to said frame, said carrying member having a substantially U-shaped profile.

6. The foldable carrier of claim 5 wherein a terminal portion of said arms of said carrying member are bent to define a means for limiting the movement of an object carried on said carrier.

7. The foldable carrier of claim 6 wherein said carrying member is mounted to said frame such that when the carrying member is in its stored position it is inclined towards said frame, said movement limiting means of said carrying member are in closer proximity to the generally planar member than said cross member.

8. A foldable carrier that is mountable on a generally planar member for storing bicycles, skis, and the like, said carrier comprising:
   (a) a substantially U-shaped frame that is configured to be mounted on a generally planar member, said frame having a back member and a pair of legs that extend from opposite ends of said back member, an end portion of each of said leg being bent to form a foot, each said bend defining a stop means; and
   (b) a substantially U-shaped carrying member having a cross member and a pair of arms that extend from opposite ends of said cross member, said carrying member rotatably mounted to said frame and constrained for limited movement relative to said frame;
   (c) said carrying member movable between a stored position and a carrying position when said frame is mounted on the generally planar member, said frame and said carrying member are in substantially side-by-side relationship when said frame is mounted on the generally planar member and said carrying member is in its stored position, said arms of said carrying member tilted backwardly toward the generally planar member when said carrier member is in its stored position, said frame and said carrying member are in substantially perpendicular relationship when said frame is mounted on the generally planar member and said carrying member is in its carrying position, said carrying member being moved from its stored position to its carrying position by rotating said arms of said carrying member away from the generally planar member until said arms of said carrying member engage said stop means, said stop means preventing further rotational movement of said carrying member and holding said arms in a substantially perpendicular relationship with respect to said frame.

9. The foldable carrier of claim 8 including a friction means mounted on said frame, said friction means positioned on said frame so that it presses against and frictionally engages the generally planar member when said frame is mounted on the generally planar member.

10. The foldable carrier of claim 8 including a friction means mounted on said carrying member, said friction means positioned on said carrying member so that it presses against and frictionally engages the generally planar member when said frame is mounted on the generally planar member and said carrying member is in its carrying position.

11. The foldable carrier of claim 8 wherein a terminal portion of each of said arms of said carrying member are bent to define a means for limiting the movement of an object carried on said folding carrier.

12. The foldable carrier of claim 11 wherein said carrying member is mounted on said frame such that when the carrying member is in its stored position it is inclined towards said frame, said movement limiting means of said carrying member are in closer proximity to the generally planar member than said cross member.

13. A foldable carrier that is mountable on a generally planar member for storing bicycles, skis, and the like, said carrier comprising:
   (a) a frame that is configured to be mounted on a generally planar member, said frame having a back member and leg means that extend from said back member, an end portion of said leg means being bent to form a foot, said bend defining stop means;
   (b) first friction means mounted on said frame, said first friction means positioned on said frame so that it presses against and frictionally engages the generally planar member when said frame is mounted on the generally planar member;
   (c) a carrying member rotatably mounted to said frame and constrained for limited movement relative to said frame between a stored position and a carrying position; and
   (d) second friction means mounted on said carrying member, said second friction means positioned on said carrying member so that it presses against and frictionally engages the generally planar member when said frame is mounted on the generally planar member and said carrying member is in its carrying position;
   (e) said carrying member movable between said stored position and said carrying position when said frame is mounted on the generally planar member, said frame and said carrying member are in substantially side-by-side relationship when said frame is mounted on the generally planar member and said carrying member is in said stored position, said carrying member tilted backwardly toward the generally planar member when in said stored position, said frame and said carrying member are in substantially perpendicular relationship when said frame is mounted on the generally planar member and said carrying member is in said carrying position, said carrying member being moved from said stored position to said carrying position by rotating said carrying member away from the generally planar member until said carrying member engages said stop means, said stop means preventing further rotational movement of said carrying member and holding said carrying member in a substantially perpendicular relationship with respect to said frame.

14. The foldable carrier of claim 13 wherein said frame includes a back and a pair of legs, said legs integral with said back, said frame having a substantially U-shaped profile.

15. The foldable carrier of claim 13 wherein said carrying member includes a pair of extending arms that are integral with a cross member, said arms being rotatably connected to said frame, said carrying member having a substantially U-shaped profile.

16. The foldable carrier of claim 13 wherein a terminal portion of each said arm of said carrying member is bent to define a means for limiting the movement of an object carried on the carrier.

17. The foldable carrier of claim 16 wherein said carrying member is mounted to said frame such that when said carrying member is in said stored position it is inclined towards said frame, said movement limiting means of said carrying member are in closer proximity to the generally planar member than said cross member.

* * * * *